March 27, 1934.  L. AXIEN  1,952,232
FLEXIBLE COUPLING
Filed Dec. 22, 1930  2 Sheets-Sheet 2
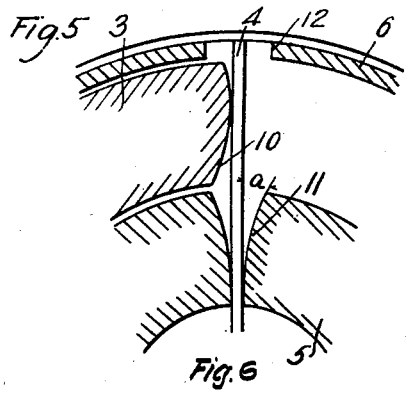
Fig. 5
Fig. 6
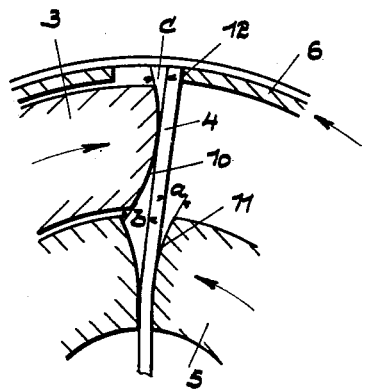
Fig. 7
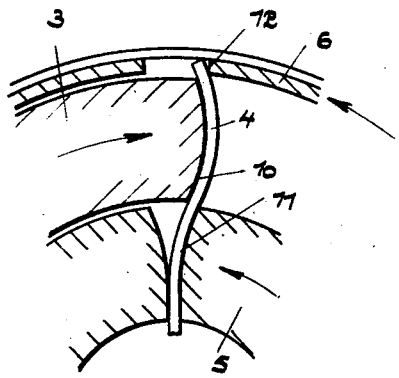
Inventor:
Leo Axien Patented Mar. 27, 1934

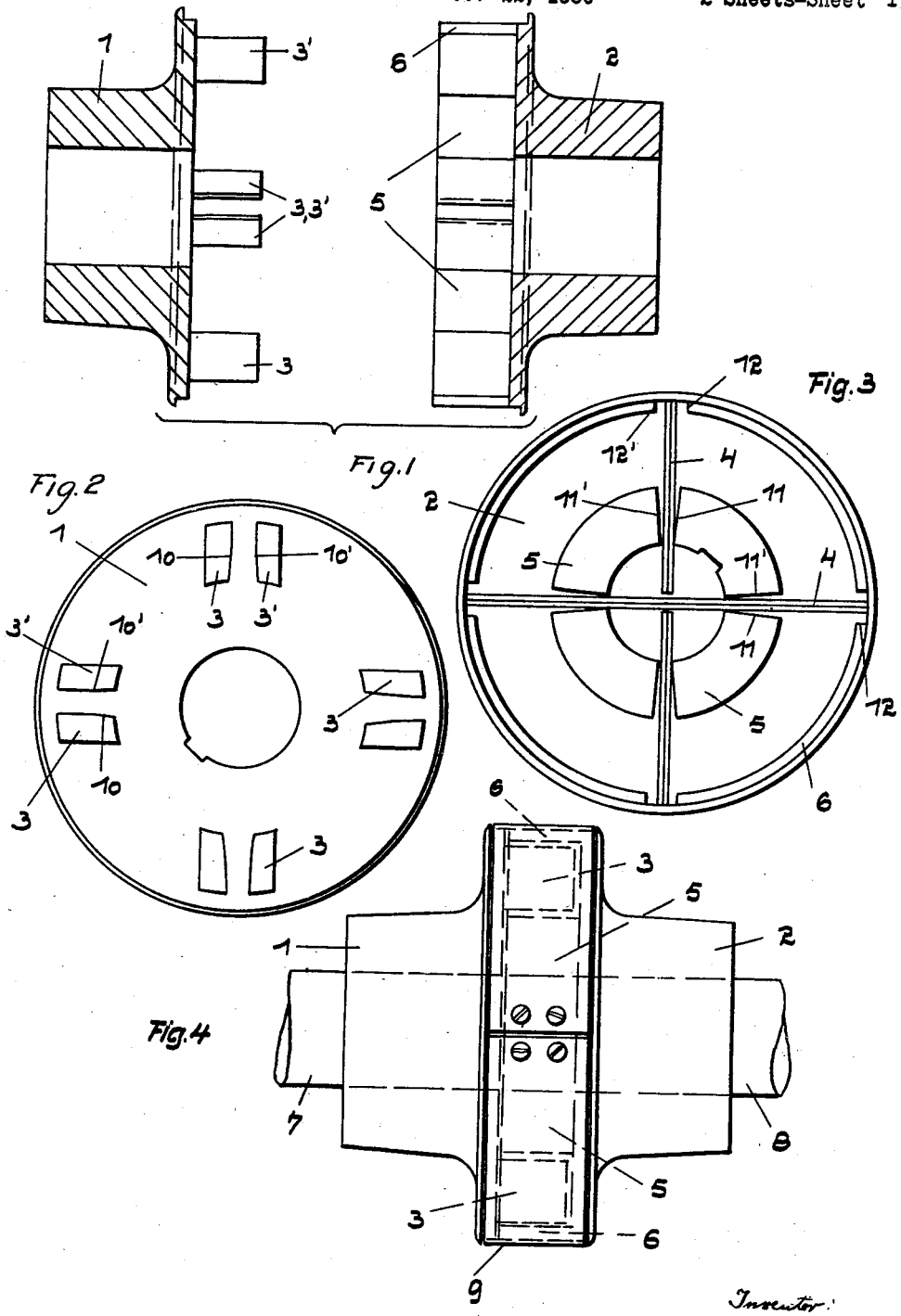

1,952,232

UNITED STATES PATENT OFFICE 1,952,232

FLEXIBLE COUPLING

Leo Axien, Altona-on-the-Elbe, Germany

Application December 22, 1930, Serial No. 504,015
In Germany January 10, 1930

7 Claims. (Cl. 64—96)

This invention relates to a yielding coupling in which blade springs are employed for transmitting the turning moment and rows of concentric projections are provided on the driving and driven elements.

Many forms of construction of such couplings are already known. To-day very high requirements are to be satisfied by yielding couplings. They are not only required to ensure a smooth starting at any time, but must also be yielding under light and heavy loads and moreover retain their yieldability under varying loads no matter how suddenly these may occur.

The yielding coupling according to the invention meets these requirements to a maximum extent, and is moreover easy to manufacture. It can further be fitted to ordinary plants, instead of the existing clutch, and thus render the connection yielding, as the space required is not greater than that necessary for an ordinary claw coupling.

The characteristic feature of the invention consists in that on the yieldable coupling, in which the transmission of the turning moment is effected by blade springs and concentric rows of projections, three rows of projections are provided, two on the one coupling element, for example the driven coupling element, and the third between them, for example on the driving coupling element, in such a manner that the projections of the driving coupling element, in taking up the rotations, bear against the blade springs, press these against the projections of the driven coupling element, whereupon, as the turning moment increases, the blade springs are bent so that, on the one hand, they bear against the flanks gripped in inward direction of the projections of the driving element and, on the other hand, against the flanks gripped in outward direction of the driven element in reducing the bending spring length.

If the coupling is intended for transmitting the power for both directions of rotation, suitable projections must be arranged for each direction of rotation. In order to ensure the yieldability of the coupling also under full load, it is proposed to make the clutching shape of the flanks so that, when transmitting forces up to full load with the springs bearing, a certain amount of play still remains between the bent springs and the flank ends.

The transmission of the turning forces from and to the centre row of projections in the coupling according to the invention always takes place from the centre or substantially from the centre of the projections, and the yieldability of the coupling for all ranges of drive is reliably attained in that the resiliency of the blade springs is doubly utilized. First the blade springs bend as one-armed levers around the middle and then they are employed as elastic carriers on the two supports. Owing to the fact that for the purpose of ensuring the flexibility, even under full load, bearing on the entire length does not occur, but a certain amount of play always remains at the ends of the flanks between these and the springs bearing thereon, shearing stressings of the springs are moreover reliably avoided also under very heavy loads.

For simplifying the fitting and particularly for accelerating the engagement and disengagement the arrangement is so designed, that the springs are pushed in between the projections from the outer side. In order to prevent the springs from being flung out, a surrounding sheet metal casing or the like is provided, which at the same time retains the lubricant for lubricating the different coupling elements. One or more springs is or are employed according to the load and the size of the coupling and either separate blade springs or layers of blade springs can be employed. Moreover the coupling parts must have sufficient mutual play, in order to prevent a transmission of vibrations and jerks, no matter of what kind, in radial and tangential direction, owing to the contact.

An embodiment of the invention is illustrated by way of example in the accompanying drawings in which:

Fig. 1 is a longitudinal section through the two coupling elements.

Fig. 2 is an inner end view of one coupling element.

Fig. 3 is an inner end view of the other coupling element.

Fig. 4 is a side elevation of the coupling in engaged position.

Fig. 5 shows the position of the springs when starting up.

Fig. 6 shows the position under normal load.

Fig. 7 shows the position under overload.

The coupling according to the invention consists of two halves 1 and 2. The coupling half 1 has a row of projections 3', 3', which have suitably shaped flanks 10 on the side coming into contact with the spring. The coupling half 2 which is provided with two rows of projections, an inner row with projections 5 and an outer row with projections 6, carries blade springs 4, which are mounted between the inner projections 5 at one end and between projections 12 situated on the circumference, or, if the circumference is not full, in apertures of the same. In taking up the load which is to be transmitted by the coupling, the projections 3 bear against the blade springs 4 and bend same around their middle, so that the springs 4 commence to bear against the flanks 11 of the projections 5.

As the bending of the springs increases, Fig. 6, they come into contact with the outer projections 6 and begin then to gradually bear against the curved flanks 10 of the projections 3. The shape of the flanks 10 and 11 is selected so that, even under full load, a certain amount of play $a$, $b$, $c$ remains between the spring 4 and the flanks 10 and 11 so that, even under full load, the yieldability is positively ensured.

If for some unforseen reason a considerable overloading of the coupling should occur, this would have no detrimental effect. In such instances the springs 4 would bear completely against the curvature of the cheeks 10 and 11, as also against the projections 12 so that between the inner and middle, and middle and outer rows of projections, the springs 4 are subjected twice to shearing stress. Consequently very considerable forces can be transmitted without fear of breaking the coupling.

The arrangement of the springs is such, that they lie in radial direction at the coupling, a continuous spring being selected for small couplings. For larger couplings the number of springs must be accordingly increased. A spring or group of springs is preferably made continuous, in which case the other springs bear against this spring in the centre of the coupling. This coupling is suitable for high running speeds.

If it is desired to uncouple or move forward the machine, the surrounding case 9 is simply removed, after which the springs can be pushed out from between projections 5, 3 and 6. This work only requires few minutes. It is even possible, to employ this coupling everywhere where claw couplings are to be engaged and disengaged during work by making the play between the projections 3 and 3' sufficiently large. In these disengagement couplings one coupling half must further be arranged shiftable on the shaft.

It should be mentioned as an important feature, that the hard blow which is produced, when engaging the couplings hitherto generally employed, is almost completely avoided in this form of construction, so that this coupling can also be used as engaging and disengaging claw coupling, also for high running speeds.

The coupling, as shown in Figs. 2 and 3, with the slots in the projections 3 and 5 can also be used for alternating directions of rotation.

I claim:—

1. A flexible coupling comprising, in combination, a driving half, a driven half, rigid projections on one of said halves, yieldable abutments on the other of said halves, said abutments comprising radial blade springs held intermediate their ends, and means on the last-named half cooperating with the outer end of said springs to limit circumferential movement thereof, said half holding said springs having portions engaged thereby intermediate the spring ends and shaped to cause a gradual flexing so that the springs conform to the shape of the engaged portions when the coupling is transmitting full load.

2. A flexible coupling comprising, in combination, a driving half, a driven half, rigid projections on one of said halves, yieldable abutments in the form of blade springs in the other of said halves and normally cooperating with said projections, the spring contacting faces of the projections being shaped to permit gradual flexing and straightening of the springs during service, said coupling halves being adapted for connection with axles, further projections adjacent the center of said other half for clamping said springs and adapted to limit the swinging out movement thereof, and means on said coupling half cooperating with the outer ends of said springs to permit limited circumferential movements thereof.

3. A flexible coupling comprising, in combination, a driving half, a driven half, rigid projections on one of said halves, spring clamping means on the other half, yielding abutments in the form of radial blade springs secured by said clamping means and cooperating with said projections, axles carrying said coupling halves, the spring engaging faces of the projections being arcuate to permit gradual flexing and straightening of the springs, the spring clamping means having flanks adapted to limit the swinging out movement of said springs, and abutments adjacent the periphery of said last mentioned coupling half between which the outer ends of the springs extend to limit the free circumferential movement thereof in both directions.

4. A flexible coupling comprising a driving half, a driven half, rigid spring engaging projections on one of said halves, spring clamping projections on the other of said halves, radial blade springs mounted between said clamping projections, said projections having curved flanks flaring outwardly to provide increasing spring supporting areas as said springs are flexed, outer projections disposed on the outer portion of said spring carrying half for limiting circumferential movement of the outer ends of said springs to the desired extent, whereby when the springs transmit full load between the rigid projections and the spring carrying half, both the ends of said springs and the portions disposed inwardly of said rigid projections are respectively supported on the outer projections and the curved flanks of said clamping means.

5. A flexible coupling, comprising in combination, a driving half, a driven half, a shaft for the support of each of said halves, rigid projections on one of said halves, flexible members inserted radially in the other half, said members comprising flat composite leaf springs held by said carrying half adjacent the shaft and means on the last named half cooperating with the outer ends of said springs to limit the circumferential movement thereof, the rigid projections being engaged with the springs, said half holding said springs having portions adjacent to portions holding said springs, shaped to cause a gradual flexing of the springs so that the springs conform to the shape of the engaged portions when the coupling is transmitting full load.

6. A flexible coupling, comprising in combination, a driving half, a driven half, a shaft for the support of each of said halves, rigid projections on one of said halves, flexible means inserted radially in the other half, said members comprising flat composite leaf springs held by said carrying half adjacent the shaft and means on the last named half cooperating with the outer ends of said springs to limit the circumferential movement thereof, the rigid projections being engaged with the springs, said half holding said springs having portions adjacent to portions holding said springs, shaped to cause a gradual flexing of the springs so that the springs conform to the shape of the engaged portions when the coupling is transmitting full load, said coupling being adapted to take up in both linear and angular misalignment of the shafts.

7. A flexible coupling, comprising in combination, a driving half, a driven half, a shaft for the support of each of said halves, rigid projections on one of said halves, a circular groove in one half so spaced and dimensioned as to receive said projections on the other half, radially positioned slots in both halves, said slots being spaced at correspondingly equal angles in both halves, flexible members inserted radially in the slots in the grooved half, said members comprising flat composite leaf springs held by the carrying half adjacent the shaft and engaged by the projections intermediate their ends, means on the grooved half cooperating with the outer ends of said springs to limit the circumferential movements thereof, said half holding said springs having portions, adjacent to said spring holding portions, shaped to cause a gradual flexing of the springs so that the springs conform to the shape of the engaged portions when the coupling is transmitting full load.

LEO AXIEN.